United States Patent [19]

Glaum et al.

[11] 4,062,924
[45] Dec. 13, 1977

[54] REDUCTIVE LEACHING OF LIMONITIC ORES WITH HYDROGEN SULFIDE

[75] Inventors: Gerald Vernon Glaum, Oakville; Charles Edward O'Neill; Kohur Nagaraja Subramanian, both of Mississauga, all of Canada

[73] Assignee: The International Nickel Company, Inc., New York, N.Y.

[21] Appl. No.: 687,910

[22] Filed: May 19, 1976

[30] Foreign Application Priority Data

June 10, 1975 Canada .................................. 229006

[51] Int. Cl.$^2$ ..................... C01G 49/10; C01G 49/14; C01G 53/00
[52] U.S. Cl. .................................... 423/150; 423/140; 423/493; 423/558; 423/573 R; 423/573 G
[58] Field of Search ............... 423/150, 140, 558, 140, 423/561, 493; 75/119

[56] References Cited

U.S. PATENT DOCUMENTS

| | | | |
|---|---|---|---|
| 2,045,625 | 6/1936 | White | 423/150 |
| 2,722,480 | 11/1955 | Roy | 75/108 |
| 2,726,953 | 12/1955 | Roy et al. | 75/108 |
| 3,093,559 | 6/1963 | White et al. | 204/123 |
| 3,244,513 | 4/1966 | Zubryckyj et al. | 75/119 |
| 3,367,740 | 2/1968 | Zubryckyj et al. | 423/150 |
| 3,421,850 | 1/1969 | Peterson | 423/561 |
| 3,544,306 | 12/1970 | McGauley | 423/37 |
| 3,980,752 | 9/1976 | Fekete et al. | 423/140 |

FOREIGN PATENT DOCUMENTS 2,239,413 3/1973 Germany ............................ 423/140

OTHER PUBLICATIONS

*Transactions/Section C*, vol. 82 (1973) pp. c79–c87 Institute of Mining and Metallurgy
Bjorling, G. "Reductive Leaching of Ores, Especially Manganese Ores" in *Progress in Mineral Dressing*, Almquist & Wiksell, Stockholm 1958 pp. 705–709.
Scott, W. W. (Editor) *Standard Methods of Chemical Analysis* D. Van Nostrand Co., New York, 1918, pp. 210, 211, 215, 216.

*Primary Examiner*—O. R. Vertiz
*Assistant Examiner*—Brian E. Hearn
*Attorney, Agent, or Firm*—Miriam W. Leff; Ewan C. MacQueen

[57] ABSTRACT

A process is provided for extracting iron values as soluble ferrous salts from a limonitic ore which comprises leaching the ore in an acidic medium in the presence of a reducing agent, the reducing agent being a sulfide. Non-ferrous metal values are also extracted from the ore and they may be selectively separated from the solubilized iron salts.

8 Claims, 1 Drawing Figure

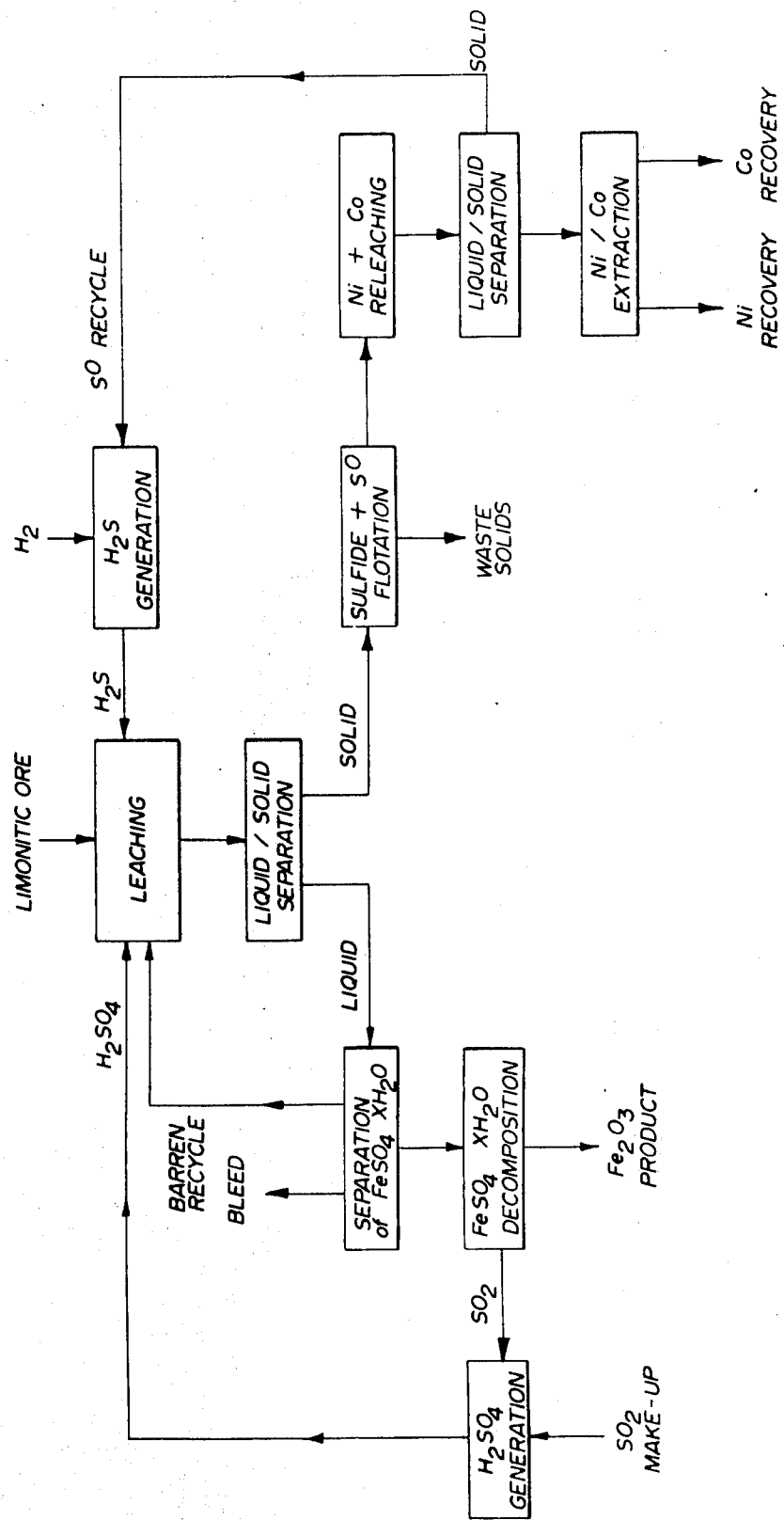

REDUCTIVE LEACHING OF LIMONITIC ORES WITH HYDROGEN SULFIDE

This invention relates to a hydrometallurgical method for extracting metal values from limonitic type ores, and more particularly to a method for treating limonitic ores containing a minor amount of nonferrous metals such as nickel and cobalt.

Limonitic ores are oxidic deposits characterized by a high iron content chiefly in the form of ferric oxide minerals. Goethite, represented approximately by the formula FeO(OH) is a principal mineral constituent. The ores may contain nonferrous metals such as nickel, cobalt, chromium, manganese, magnesium and aluminum. Typically, nickeliferous limonites contain about 0.8 to 1.5% Ni, up to about 0.1 to 0.2% Co, about 1.5% to 3% Cr, about 0.5 to 1.5% Mn, about 0.5 to 1% Mg, about 2 to 7% Al, and about 40 to 50% iron. Limonites are a potentially valuable source of metals such as nickel and cobalt, despite their low concentration in the ore, because of the extent of the deposits. Further, limonitic ores could provide a valuable source of iron if adequate separation of iron from nonferrous metals like nickel, cobalt, and chromium can be effected.

It is well known that limonitic ores cannot be processed in the same manner as sulfidic ores. Essentially, the difficulty lies in that the ore consists of a bulk phase, goethite, containing impurities, including the nickel and cobalt, dispersed throughout. Since the nickel and cobalt are not contained in a discrete minor phase, they cannot be separated from the bulk of the ore by physical techniques such as flotation, magnetic separation, size separation, or gravity, separation. Consequently, the bulk of the ore must be treated metallurgically to recover the valuable nonferrous metals which are present in only small amounts. Various methods have been proposed for recovering the valuable nonferrous metals from limonitic ores.

Among the proposed processes are those which involve a preliminary pyrometallurgical treatment of the ore prior to selective extraction of Ni and Co by a hydrometallurgical treatment. For example, the ore may be roasted at 600° to 800° C in an atmosphere containing Co. and/or $H_2$ to selectively reduce Ni, Co, and a small portion of the Fe which combine as a discrete alloy phase. The remaining iron will be present as reduced oxides such as magnetite ($Fe_3O_4$). In one currently practiced application of this process, nickel and cobalt are selectively extracted from the alloy phase by leaching in ammoniacal media. Other proposed methods include leaching the reduced ore with acidic solutions or with chlorine and water. Such processes require large amounts of energy to dry and heat the ore for reduction.

Other processes have been proposed for selectively extracting nickel and cobalt by directly leaching the limonite in acidic media at high temperatures. For example, in one process currently in use limonitic ore is leached in sulfuric acid solution at 240° C (about 500 psig steam pressure) to selectively extract Ni and Co leaving most of the Fe in the residue as hematite. One disadvantage of this process is the high capital cost of leaching vessels to contain the abrasive, corrosive slurry at the leaching conditions. Another disadvantage is the formation of massive scale deposits within the autoclave during leaching, necessitating frequent shutdowns and high labor costs to clean the autoclaves. A further limitation of the processes of this type is that the iron is retained in the leach residue along with impurities such as sulfur, chromium, alumina, and silica. Thus, if the iron recovery is desired, further processing of the residue will be necessary.

Another process, U.S. Pat. No. 2,584,700, has been proposed to overcome this limitation. The process involves leaching the limonitic ore in sulfuric acid solution above about 65° C with simultaneous addition of a gaseous mixture of sulfur dioxide and sulfur trioxide. In general, dissolution of limonite to form ferric sulfate solutions requires acid in excess of the stoichiometric requirement to achieve reasonable dissolution rates. In this instance, sulfur dioxide may act as a reducing agent, however the result is generation of additional sulfuric acid by the reaction

$$Fe_2(SO_4)_3 + SO_2 + 2H_2O \rightarrow 2FeSO_4 + 2H_2SO_4$$

Thus, the final leach solution contains a considerable concentration of free sulfuric acid. This solution is digested with additional ore to consume free acid, however even if equilibrium is achieved, the solution must contain some free acid in addition to the ferric iron. The process then proposes to reduce the ferric iron with metallic iron, however metallic iron will also react with free acid by

$$Fe° + H_2SO_4 \rightarrow FeSO_4 + H_2$$

resulting in hazardous evolution of hydrogen in addition to excessive consumption of metallic iron. In general, the excessive consumption of sulfuric acid, excessive consumption of metallic iron, and the hazardous evolution of hydrogen gas make this process unattractive.

It is an object of the present invention to provide a method for treating limonitic type ores to recover iron in addition to nickel and cobalt as marketable products. It is also an object of the present invention to provide a method for treating limonitic type ores in which no drying or thermal pretreatment of the ore is required. Another object is to provide a hydrometallurgical method in which leaching is conducted under essentially atmospheric conditions. A further object is to provide a method in which reagents can be reused and the hazards of environmental pollution are reduced. Still another object of the present invention is to provide an improved method for leaching a limonitic ore to extract metal values including iron in the divalent state into the leach solution. A further object is to provide a method for leaching a limonitic ore in which an in-situ separation of Ni and Co from Fe can be obtained by precipitating Ni and Co as sulfides while iron is extracted into the leach solution in the divalent state.

Other objects and advantages will become apparent from the following description taken in conjunction with the accompanying drawing, which illustrates an embodiment of the present invention.

BRIEF DESCRIPTION OF DRAWING

The accompanying FIGURE is a schematic flowsheet showing the steps for treating a nickeliferous limonite according to a preferred embodiment in which selective in-situ separation of Ni and Fe values is effected.

THE INVENTION

Generally, the present invention contemplates a process for extracting iron as a ferrous salt from a limonitic ore comprising metal values soluble in acidic leaching media, said soluble metal values including a major amount of iron and a minor amount of nonferrous metals, at least one nonferrous metal value being selected from nickel and cobalt, comprising leaching said ore in an acidic medium in the presence of a reducing agent, said reducing agent being a sulfide. According to one aspect of the invention other soluble metals contained in the ore including nickel and cobalt are simultaneously extracted into the leach solution with the iron. In another embodiment the leaching conditions are adjusted to effect an in-situ separation of nickel and cobalt values.

The reductant, as noted above, is a sulfide. Examples of suitable sulfides are $H_2S$, FeS, ammonium sulfide, alkali metal sulfides, alkaline earth metal sulfides, and the like. $H_2S$ is a preferred reducing agent and is used herein to illustrate this invention. The reductant is used in sufficient amount to reduce substantially of the $Fe^{+3}$ in the ore to $Fe^{+2}$. Elemental sulfur is formed as a product. In the embodiment using $H_2S$ as the sulfide, the $H_2S$ is continuously added to the slurry to maintain a slight pressure in excess of atmospheric to reduce the ferric iron simultaneously with its dissolution.

The acidic media may be composed of any nonoxidizing acid which forms a soluble salt with the metals to be extracted, e.g. sulfuric and hydrochloric. Sulfuric acid is used herein to illustrate this invention.

It will be appreciated that complex and simultaneous reactions occur in the leaching medium. However, it is believed that the principal reaction occurring with respect to the main iron constituent of the limonite in the presence of $H_2S$ and $H_2SO_4$ is:

$$2FeO(OH) + 2H_2SO_4 + H_2S \rightarrow 2FeSO_4 + 4H_2O + S°$$

The process is generally carried out under mild conditions, e.g. up to 110° C, advantageously at about 50° C to about 100° c, and under atmospheric pressure, although higher pressures can be used. In one embodiment of this process, the pH of the acid medium can range up to about 2.0, preferably to a pH no greater than about 1.5 in order that nickel and cobalt are retained in solution with the iron. Above a pH of about 2, nickel and cobalt begin to precipitate out of the solution. Accordingly in another embodiment the pH is permitted to rise to about 2 to 3 so that the extracted nickel and cobalt values are precipitated as sulfides in-situ.

According to one aspect of this invention the leaching is carried out by slurrying raw limonitic ore in an aqueous acidic medium containing sufficient acid, e.g. $H_2SO_4$, to dissolve all the iron as well as the other metals. The nonferrous metal values, e.g. Ni, Co, Mn, Mg, Al, will be extracted as soluble salts, e.g. sulfates of nickel, cobalt, manganese, magnesium and aluminum. Generally, the amount of acid used should be slightly in excess of stoichiometric to the total soluble metals present. The final pH after total dissolution or when the reaction is ended is preferably less than about 2.0. As indicated above, the pH greater than about 2, nonferrous metals such as Ni and Co begin to precipitate out of the leach solution. The sulfide is present in sufficient amount to reduce the ferric iron simultaneously with its dissolution. If the sulfide is gaseous, e.g. $H_2S$, the amount of sulfide can be controlled by maintaining the gaseous feed at a slight overpressure.

In an alternative embodiment of this invention, if less than a stoichiometric amount of acid relative to the total soluble metal is used, the nonferrous metal values, e.g. Ni, Co, are selectively precipitated as sulfides when nearly all of the acid has been consumed. Thus, an in-situ separation of Ni and Co can be effected to produce a virtually Ni and Co free Fe salt solution. It is believed that the overall reaction occurring with respect to nickel is:

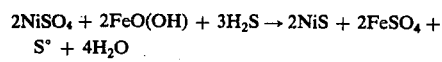
$$2NiSO_4 + 2FeO(OH) + 3H_2S \rightarrow 2NiS + 2FeSO_4 + S° + 4H_2O$$

To maximize this selective separation the acid is added in insufficient amount to dissolve nickel and cobalt in addition to the iron and other soluble metals. Sufficient acid should be present, however, to have a final pH of less than about 3, since precipitation of major amounts of FeS will occur at a pH of 3 and higher. In general, the acid is used in an amount to provide about 90% to 95% stoichiometric to the soluble metal content of the ore, e.g. about 95%. In this alternative embodiment the total sulfide is preferably sufficient to be stoichiometric for reducing substantially all the $Fe^{+3}$ to $Fe^{+2}$ and to precipitate substantially all the Ni and Co present as the sulfides.

The total solids content of the leach slurry may vary, depending on the acid employed. In a sulfuric acid leach, the pulp density is suitably up to about 25%, preferably about 20% solids; with hydrochloric acid suitably up to about 40%, preferably about 30% solids.

Dissolved metal values, precipitated nickel and cobalt sulfides, and elemental sulfur can be recovered from the leach solution and the residue by known techniques.

It will be noted that limonitic ores generally contain chromium values. The chromium is not soluble to any great extent under the acidic leaching conditions of the present process. In general even in the presence of excess acid the leach residue is considerably enriched in chromium and the chromium can be recovered from such residue after elemental sulfur is removed.

Referring now to the drawing. In the embodiment illustrated in the drawing, a nickeliferous limonited containing 1.23% Ni, 0.13% cobalt, and 46.9% iron is treated to effect an in-situ separation of nickel and iron. The ore, which has been screened to a particle size of minus 28 mesh (TSS) is fed to an aqueous acid medium in an amount sufficient to provide a pulp density of about 20 to 25%. The sulfuric acid is present in an amount of 95% of stoichiometric for the soluble metal content in the ore, assuming the iron will dissolve as $Fe^{+2}$. Hydrogen sulfide is fed to the acidic slurry on demand to maintain an over pressure of 2 psig. The total amount of hydrogen sulfide consumed is stoichiometric for reducing substantially all the $Fe^{+3}$ to $Fe^{+2}$, and for precipitating substantially all of the nickel as NiS and cobalt as CoS. The leach reaction is permitted to occur for a period of 1 to 6 hours.

Thereafter, the leach solution is filtered and iron values are recovered by, for example, crystallizing ferrous sulfate, which is then decomposed to $Fe_2O_3$ and $SO_2$. In the embodiment illustrated, $SO_2$ is recovered for $H_2SO_4$ generation. The regenerated $H_2SO_4$ is recycled in the leaching stage. The $Fe_2O_3$ can be reduced to metallic iron or marketed directly.

The solid separated from the leach solution is treated for sulfide recovery, e.g. by conventional flotation techniques to concentrate nickel and cobalt sulfides and elemental sulfur. Nickel and cobalt are recovered from this concentrate by, for example, redissolving the nickel and cobalt in acidic media leaving a residue of elemental sulfur which can be recycled for $H_2S$ generation. Iron values contained in this solution may be precipitated by oxidizing and neutralizing to a pH of about 3. Cobalt is separated from nickel in the acidic solution by solvent extraction with, for example, D2EHPA (diethylhexyl phosphoric acid). Marketable nickel and cobalt products can be recovered from their respective solutions by hydrogen reduction or electrowinning.

For the purpose of giving those skilled in the art a better understanding of the invention, the following illustrated examples are given.

EXAMPLE 1

This example illustrates the embodiment of the invention in which a preponderant amount of Ni, Co and Fe values are extracted into the leach solution.

A limonitic ore, screened to pass 28 mesh (TSS), containing 1.22% Ni, 0.15% Co, and 46.1% Fe is added to a leaching vessel containing a $H_2SO_4$ solution. The solution contains 110% $H_2SO_4$ by weight of limonitic ore or about 105% of the stoichiometric requirement to dissolve the soluble metals in the ore. After raising the slurry to the leaching temperature, $H_2S$ is metered into the leach slurry and the reaction is permitted to proceed for 4 hours. After filtering and washing, the leach residue and leach solution are analyzed for Ni, Co, and Fe values. The total $H_2S$ consumption is calculated from the elemental sulfur content of the leach residue. The data tabulated in Table I show the rate of dissolution as a function of slurry pulp density and leaching temperature.

The results in Table I show that rate of dissolution of the ore is dependent on the pulp density and on the temperature. Comparison of tests A and B shows that increasing the pulp density not only increases the concentrations of nickel and iron in solution, but increases the rate of dissolution of the ore as well. Comparison of tests A and C shows that increasing the temperature markedly increases the rate of dissolution of the ore.

Analyses of the leach solution of Test D, which is given in Table II, shows that under the given conditions a leach solution is produced containing 3.62 grams of Ni per liter, 0.4 grams of cobalt per liter, and 135 grams of iron per liter.

TABLE I

| Test | Pulp Density (% solids) | Temp (°C) | Time (hr) | pH | Redox* (Pt/SCE) (mv) | $H_2S$ Consumption (weight %) | Residue Analysis (%) Weight | Ni | Fe | S° | Extraction (%) Ni | Co | Fe |
|---|---|---|---|---|---|---|---|---|---|---|---|---|---|
| A | 10 | 60 | 1 | 0.1 | +230 | — | 83 | 1.16 | 44.0 | — | 24 | — | 23 |
|   |    |    | 2 | 0.4 | +240 | — | 64 | 0.99 | 38.2 | — | 50 | — | 49 |
|   |    |    | 3 | 0.7 | +190 | — | 44 | 0.73 | 30.7 | — | 75 | — | 72 |
|   |    |    | 4 | 1.0 | +130 | 11.2 | 31 | 0.42 | 21.8 | 34.0 | 90 | 99 | 86 |
| B | 20 | 60 | 1 | —   | +420 | — | 66 | 1.09 | 41.9 | — | 43 | — | 42 |
|   |    |    | 2 | 0.2 | +340 | — | 41 | 0.76 | 31.7 | — | 75 | — | 73 |
|   |    |    | 3 | 0.6 | +250 | — | 26 | 0.37 | 20.4 | — | 92 | — | 39 |
|   |    |    | 4 | 0.9 | +190 | 13.3 | 26 | 0.18 | 12.5 | 48.1 | 96 | 99 | 93 |
| C | 10 | 80 | 1 | 0.6 | +370 | — | 52 | 0.97 | 37.6 | — | 59 | — | 58 |
|   |    |    | 2 | 1.5 | +120 | — | 24 | 0.23 | 15.3 | — | 96 | — | 92 |
|   |    |    | 3 | 1.8 | + 50 | — | 22 | 0.06 | 7.35 | — | 99 | — | 97 |
|   |    |    | 4 | 1.8 | + 40 | 13.7 | 22 | 0.05 | 6.25 | 58.5 | 99 | 92 | 97 |
| D | 20 | 80 | 1 | 0.2 | +520 | — | 44 | 0.97 | 40.4 | — | 65 | — | 61 |
|   |    |    | 2 | 0.4 | +450 | — | 35 | 0.68 | 82.1 | — | 81 | — | 76 |
|   |    |    | 3 | 0.6 | +320 | — | 23 | 0.12 | 11.1 | — | 98 | — | 95 |
|   |    |    | 4 | 1.2 | +220 | 13.8 | 23 | 0.03 | 4.92 | 56.3 | 99 | 89 | 98 |

*Redox potential in millivolts based on Platinum vs. a Standard calomel electrode
"—" means data not obtained

EXAMPLE 2

This example illustrates the embodiment of the invention in which Ni and Co are selectively separated from Fe in-situ. It also shows the effect of time, and the amount of acid added on selectivity on the given limonitic ore treated.

In the tests of this example the limonitic ore, screened to minus 28 mesh (TSS), contained 1.22% Ni, 0.15% Co, and 46.1% Fe. Ths sulfuric acid required to solubilize all the soluble metal values in the ore (iron is calculated as $Fe^{+2}$) is predetermined to be approximately 105 weight % $H_2SO_4$, based on the weight of the ore. Thus, on a weight basis approximately 95:100 $H_2SO_4$:ore or about 100% $H_2SO_4$ by weight of ore is equivalent to 95% of the stoichiometric amount of acid required to dissolve all of the soluble metal values in the ore, e.g. Ni, Co, Fe, Mn, Al, and Mg. The leaching tests of this example are carried out using the procedure described in Example 1. Each test is carried out at 20% solids pulp density and 80° C. The data in Table II show the rate of dissolution and the selective precipitation of Ni and Co as a function of the amount of acid added.

The results in Table II show that when the limonite is leached with less than sufficient acid to dissolve all the soluble metal values, nickel and cobalt and precipitated from solution as sulfides. Comparison of Tests D and E shows that longer leaching times are required to obtain complete reaction at the lower acid level. Comparison of Tests E and F shows that when less than sufficient acid to dissolve all of the soluble metals is added, nickel and cobalt are precipitated from solution as sulfides leaving a very high purity ferrous sulfate solution. Precipitation of sulfides in Test F was observed to occur when the pH reached 2.5 and redox potential of -160 mV (Pt/SCE).

TABLE II

Test Conditions: Pulp Density: 20% solids
Temperature: 80° C

| Test # | $H_2SO_4$(1) (weight %) | Time (hr) | pH | Redox (2) (Pt/SCE) (mV) | $H_2S$ Consumed (weight %) | Residue Analyses (%) weight | Ni | Fe | S° | Solution Analyses (GRAMS PER LITER) Ni | Co | Fe | (%) Ni | Co | Fe |
|---|---|---|---|---|---|---|---|---|---|---|---|---|---|---|---|
| D | 110 | 1 | 0.2 | +520 | — | 44 | 0.97 | 40.4 | — | 2.38 | — | 84.2 | 65 | — | 61 |
|   |     | 2 | 0.4 | +450 | — | 35 | 0.68 | 32.1 | — | 2.96 | — | 105 | 81 | — | 76 |

TABLE II-continued

Test Conditions: Pulp Density: 20% solids
Temperature: 80° C

| Test # | H$_2$SO$_4$ (1) (weight %) | Time (hr) | pH | Redox (2) (Pt/SCE) (mV) | H$_2$S Consumed (weight %) | Residue Analyses (%) |  |  |  | Solution Analyses |  |  |  |  |  |
|---|---|---|---|---|---|---|---|---|---|---|---|---|---|---|---|
|  |  |  |  |  |  |  |  |  |  | (GRAMS PER LITER) |  |  | (%) |  |  |
|  |  |  |  |  |  | weight | Ni | Fe | S* | Ni | Co | Fe | Ni | Co | Fe |
|  |  | 3 | 0.6 | +320 | — | 23 | 0.12 | 11.1 | — | 3.58 | — | 131 | 98 | — | 95 |
|  |  | 4 | 1.2 | +220 | 13.8 | 23 | 0.03 | 4.92 | 56.3 | 3.62 | 0.40 | 135 | 99 | 89 | 98 |
| E | 105 | 1 | 0.2 | +500 | — | 52 | 1.00 | 40.2 | — | 2.17 | — | 75.3 | 60 | — | 55 |
|  |  | 2 | 0.6 | +440 | — | 38 | 0.72 | 32.6 | — | 2.86 | — | 100 | 79 | — | 73 |
|  |  | 3 | 0.9 | +360 | — | 30 | 0.49 | 24.5 | — | 3.19 | — | 115 | 88 | — | 84 |
|  |  | 4 | 1.6 | +250 | — | 26 | 0.15 | 11.4 | — | 3.52 | 0.38 | 129 | 97 | 86 | 94 |
|  |  | 6 | 2.2 | −150 | 13.5 | 23 | 0.05 | 5.20 | 55.4 | 3.59 | 0.36 | 133 | 99 | 82 | 97 |
| F | 100 | 1 | 0.3 | +500 | — | 50 | 0.99 | 39.8 | — | 2.16 | — | 77.4 | 60 | — | 57 |
|  |  | 2 | 0.7 | +420 | — | 40 | 0.76 | 33.5 | — | 2.77 | — | 96.4 | 77 | — | 71 |
|  |  | 3 | 1.0 | +340 | — | 32 | 0.47 | 24.3 | — | 3.16 | — | 113 | 88 | — | 83 |
|  |  | 4 | 2.2 | + 20 | — | 26 | 0.13 | 10.9 | — | 3.49 | 0.39 | 128 | 97 | 88 | 94 |
|  |  | 6 | 1.4 | − 90 | 15.6 | 33 | 3.71 | 22.6 | 44.4* | 0.004 | 0.004 | 114 | 0.1 | 1.0 | 84 |

(1) Based on the weight of the ore
(2) Redox potential in millivolts based on Platinum vs. a Standard calomel electrode
*Total sulfur
"—" means data not obtained Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

What is claimed is:

1. A process for extracting iron as a soluble ferrous salt from a limonitic ore comprising metal values soluble in acidic leaching media, said soluble metal values including a major amount of iron in the ferric state and a minor amount of nonferrous metals, at least one nonferrous metal value being selected from nickel and cobalt, comprising leaching a slurry of said ore at a temperature of up to about 110° C in an acidic leaching medium and feeding gaseous hydrogen sulfide to said slurry as a reducing agent for iron from the ferric to the ferrous state, said leaching medium comprising a nonoxidizing acid which forms soluble salts with said acid soluble metal values, the acid being present in sufficient amount to provide at least the stoichiometric amount required to dissolve substantially all the soluble metal values in the ore and a final pH during the leaching of up to about 2, whereby ferric iron is extracted into the leaching medium as a soluble ferrous salt of the acid and nickel and cobalt values are extracted into the solution.

2. A process according to claim 1, wherein the reaction is carried out at a temperature in the range of about 50° to about 100° C and at substantially atmospheric pressure.

3. A process according to claim 1, wherein the acid medium comprises sulfuric or hydrochloric acid.

4. A process according to claim 1, wherein the acidic medium comprises sulfuric acid and the limonite ore is provided in the sulfuric acid medium as a slurry having a pulp density of up to about 25% solids.

5. A process according to claim 1, wherein the acidic medium comprises hydrochloric acid and the limonite ore is provided in the hydrochloric acid medium as a slurry having a pulp density of up to about 40% solids.

6. A process according to claim 1, wherein the acid is provided in the leaching medium in an amount at least equivalent to stoichiometric for the metal values soluble in said medium and to give a final pH in the leaching medium of less than about 2, and the leaching temperature is maintained for a period of time sufficient to maximize the extraction of said soluble metal values in the leaching medium.

7. A process for treating a limonitic ore comprising metal values soluble in acidic leach media, said soluble metal values including a major amount of iron in the ferric state and a minor amount of nonferrous metal value being selected from nickel and cobalt, to extract iron as a soluble ferrous salt and to extract quantitatively said nonferrous metal values as soluble salts, comprising: leaching a slurry of said ore at a temperature up to about 110° C in an acidic medium and feeding gaseous hydrogen sulfide to the slurry as a reducing agent for iron from the ferric to the ferrous state, said acid being sulfuric or hydrochloric acid and said acid being provided in an amount at least equivalent to stoichiometric for the acid soluble metal values and to give a leaching medium with a final pH of less than about 2.

8. A process according to claim 7, wherein said hydrogen sulfide is provided continuously and in an amount to maintain a pressure slightly in excess of atmospheric to reduce ferric iron substantially simultaneously with its dissolution.

* * * * *